US 6,659,523 B2

(12) United States Patent  (10) Patent No.: US 6,659,523 B2
Jasperse  (45) Date of Patent: *Dec. 9, 2003

(54) TRANSFER APPARATUS FOR AUTOMATED PARTS MOVEMENT

(76) Inventor: Thomas J. Jasperse, 3438 Taylor St., Jenison, MI (US) 49428

( * ) Notice: Subject to any disclaimer, the term of this patent is extended or adjusted under 35 U.S.C. 154(b) by 0 days.

This patent is subject to a terminal disclaimer.

(21) Appl. No.: 10/118,286

(22) Filed: Apr. 8, 2002

(65) Prior Publication Data
US 2002/0109365 A1 Aug. 15, 2002

Related U.S. Application Data

(63) Continuation of application No. 09/422,578, filed on Oct. 21, 1999, now Pat. No. 6,367,856.
(60) Provisional application No. 60/129,487, filed on Apr. 15, 1999.

(51) Int. Cl.$^7$ .............................. B25J 15/08; B66C 1/66
(52) U.S. Cl. .............................. 294/88; 294/116; 294/2
(58) Field of Search .............................. 294/2, 94, 88, 294/116, 119.1, 86.1, 86.15, 907; 901/37, 39

(56) References Cited

U.S. PATENT DOCUMENTS

| 1,697,590 A | 1/1929 | Dodds ........................ 294/86.1 |
| 1,719,584 A | 7/1929 | Bonner ...................... 294/86.15 |
| 1,839,805 A | 1/1932 | Sampson |
| 2,381,657 A | 8/1945 | Eksergian et al. ............. 294/88 |
| 2,575,473 A | 11/1951 | Selseth .......................... 145/90 |
| 2,894,616 A | 7/1959 | Young .......................... 198/218 |
| 2,996,330 A | 8/1961 | Hutto ........................... 294/88 |
| 3,010,587 A | 11/1961 | Hollinger ....................... 214/1 |
| 3,013,835 A | 12/1961 | Blatt ............................ 294/88 |
| 3,595,557 A | 7/1971 | Daniels ........................ 269/32 |
| 3,773,189 A | 11/1973 | Kitamura et al. ............... 214/1 |
| 4,227,851 A | 10/1980 | Beezer ........................ 414/626 |
| 4,402,133 A | 9/1983 | Cribbs et al. .................. 29/739 |
| 4,607,873 A | 8/1986 | Nusbaumer et al. ........... 294/88 |

(List continued on next page.)

FOREIGN PATENT DOCUMENTS

| DE | 4111842 | 10/1991 | .................. 294/88 |
| GB | 966055 | 1/1964 | .................. 294/88 |
| JP | 274986 | 11/1989 | .................. 294/88 |
| JP | 406031673 | 2/1994 | .................. 294/88 |
| SU | 667485 | 6/1979 | .................. 294/88 |
| SU | 796170 | 1/1981 | .................. 294/88 |

OTHER PUBLICATIONS

Abstract and Figures for EP–265–814: Retracting Aligning and Fixing Device which Grips the Object—In Three/ Dimensional Space, has symmetrical finger type gripper and retraction cone into which the device is pulled for precise positioning; published May, 1988.

(List continued on next page.)

Primary Examiner—Eileen D. Lillis
Assistant Examiner—Paul T. Chin
(74) Attorney, Agent, or Firm—Van Dkye, Gardner, Linn & Burkhart, LLP

(57) ABSTRACT

A transfer apparatus for automated parts movement includes a cylinder and a piston assembly slidably positioned within the cylinder. The piston assembly includes an outer piston having a recess in which an inner piston is slidably received. A transfer assembly is attached to the piston assembly and includes an inner rod, a sheath, and a gripper. Introduction of fluid at one port or end of the cylinder moves the piston assembly to extend the gripper and transport a gripped part to a target destination. At the target destination, the transfer assembly is moved via pressurized fluid in the cylinder to cause the gripper to release the gripped part. Introduction of fluid generally at an opposite end of the cylinder moves the transfer assembly and gripper to a retracted position relative to the cylinder.

7 Claims, 4 Drawing Sheets

U.S. PATENT DOCUMENTS

| | | | |
|---|---|---|---|
| 4,705,311 A | 11/1987 | Ragard | 294/88 |
| 4,729,588 A | 3/1988 | Kratzer | 294/88 |
| 4,805,951 A | 2/1989 | Andersson et al. | 294/116 |
| 4,892,344 A | 1/1990 | Takada et al. | 294/88 |
| 4,911,490 A | 3/1990 | Akagawa | 294/88 |
| 4,950,011 A | 8/1990 | Borcea et al. | 294/2 |
| 5,033,785 A | 7/1991 | Woolley, Jr. | 294/104 |
| 5,138,754 A * | 8/1992 | Casteel et al. | 294/94 |
| 5,190,334 A | 3/1993 | Sawdon | 294/94 |
| 5,201,838 A | 4/1993 | Roudaut | 294/88 |
| 5,234,244 A | 8/1993 | Kim | 294/88 |
| 5,400,499 A | 3/1995 | Tsukida et al. | 29/723 |
| 5,626,378 A | 5/1997 | Puhl et al. | 294/88 |
| 5,639,136 A | 6/1997 | Rosengren et al. | 294/88 |
| 5,702,139 A | 12/1997 | Buck | 294/88 |
| 6,086,125 A | 7/2000 | Kovacs et al. | 294/88 |

OTHER PUBLICATIONS

Abstract and Figures for Soviet Union 984–561A for Manipulator Clamp with Power Cylinder and Two Rods—has central bar and concentric guide sleeves for wider range of applications; published Jan. 1983.

Abstract and Figure for Soviet Union 0591313 for Industrial Robot Manipulator Clamp, has two coaxial pistons in independent hydraulic cylinders with first having half cross/section area of second; published Feb. 1978.

Abstract and Figure for Soviet Union 0870111 for Manipulator Clamp—has power cylinder with coaxial rods linked to clamp head and jaw levers; published Oct. 1981.

Abstract and Figure for Soviet Union 1470500 for Gripper of Manipulator—has spring–loaded additional pistons installed inside main piston of power cylinder; published Apr. 1989.

Abstract and Figure for Soviet Union 589124 Ceramic Drain Pipe Internal Grab Unit—has power rod of primary piston passing through hollow rod of secondary piston which ensures centralisation of pipe to grab unit; published Jan. 1978.

Abstract and Figures for German Patent 2314089 Pliers for Holding Miniaturised Parts; published Sep. 26, 1974.

Abstract and figures for DE 3742–782A: Power Actuated Pliers for Fixing Pipe Clips—uses sliding block with oblique slots to actuate gripper levers; published Jul. 1989.

Abstract and Figures for EP–293–153–A: Parallel Gripper for Industrial Robot—has fingers operated through levers by two pistons in same bore, with fluid pressure applied to both; published Nov. 1988.

* cited by examiner

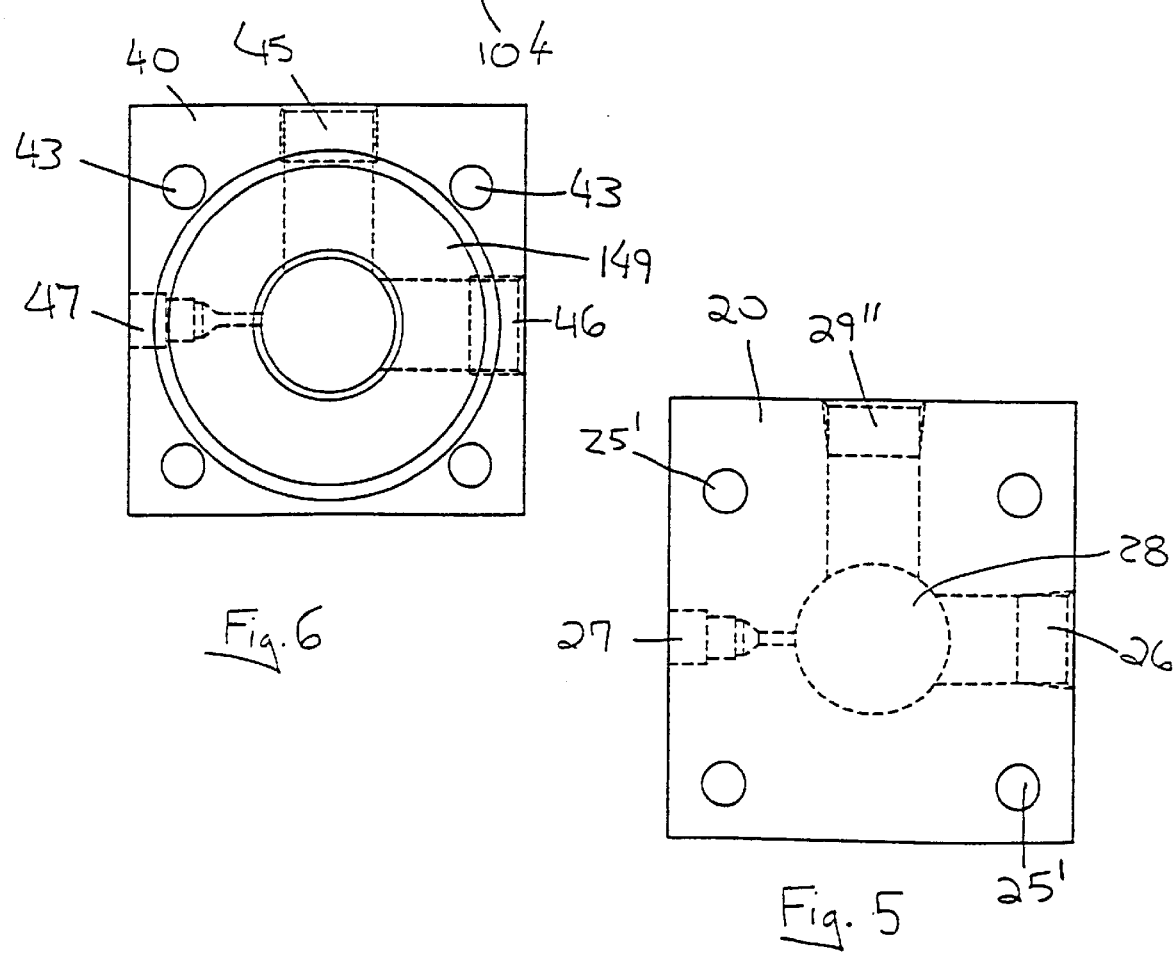

TRANSFER APPARATUS FOR AUTOMATED PARTS MOVEMENT

CROSS-REFERENCE TO RELATED APPLICATIONS

This application is a continuation of U.S. patent application Ser. No. 09/422,578, filed Oct. 21, 1999 now U.S. Pat. No. 6,367,856, which claims priority from U.S. Provisional Application Ser. No. 60/129,487, filed Apr. 15, 1999, which are hereby incorporated herein by reference.

BACKGROUND OF INVENTION

The present invention relates generally to apparatus for holding and transporting articles. In particular, the present invention relates to a fluid actuated, dual-piston transfer apparatus for holding and transporting an article.

Automated production line assemblies normally utilize transfer apparatus configured to automatically hold or grasp an article needed for the assembly of a product, and move or transport the article from a first location to a second, remote location. Once the article is transported to the second location, the transfer apparatus releases the article, retracts and subsequently repeats the process. The specific articles transported by these apparatus vary according to the particular industrial application. Frequently, transfer apparatus are used in the automated transportation of bolts, weld studs or nuts.

Normally, such apparatus include a transfer arm having a manipulator device or gripper connected to a transfer arm assembly, and an actuation assembly for moving the transfer arm in a preselected direction. The actuation assemblies most often used are electrically or pneumatically powered. The electrically powered apparatus are prone to failure due to the sophisticated electrical circuitry necessary to provide precise timed movement of the article. Consequently, such units require frequent maintenance and parts replacement, thereby increasing the manufacturing costs of a particular product. Pneumatically powered apparatus typically enjoy a greater life span than electrically powered assemblies. However, pneumatically controlled transfer apparatus are rarely used in applications requiring a high degree of positional accuracy because of their inability to accurately and dependably deposit the article in the desired location.

This lack of positional accuracy is most often encountered in industrial settings wherein the pneumatically actuated transfer apparatus is used in conjunction with other apparatus actuated by the same fluid pressure line, or where there is a large number of pneumatically operated transfer apparatus connected to the same fluid pressure line. In these situations, it is often difficult to precisely control the fluid pressure. As a result, the transfer apparatus experiences pressure fluctuations. When exposed to these pressure fluctuations, existing transfer apparatus will lose their grip on the article, causing the transfer arm to release the article while in transport. This inability to effectively transfer an article due to pressure fluctuations causes a decrease in efficiency, and often damages the article being transferred, thereby increasing material costs.

Additionally, many of these pneumatically controlled transfer apparatus require an additional mechanism to deposit the article once it is transported to its desired location. That is, a first cylinder is used to move the transfer arm from a first location to a second location, while a separately actuated, second cylinder is used to grasp and subsequently release the workpiece. This bifurcated operational sequence increases the complexity of the overall design of the transfer apparatus, and increases the probability of error given the imprecision associated with each cylinder.

Another problem confronting existing transfer apparatus is the tendency of the manipulator or gripper to rotate while in motion towards its target destination. This rotational movement of the gripper results in the inability of the transfer apparatus to provide proper placement of an article in applications where article orientation critical. Still another problem associated with existing transfer apparatus is their inability to accommodate parts of varying size without requiring the installation of a different gripper or manipulator. Substituting different grippers to accommodate articles of varying size requires the use of manual labor and necessitates placing the particular transfer apparatus off-line. Thus, in applications where there is a frequent change in article size, the costs associated with operating the particular assembly line are increased.

Consequently, there exists a need for a transfer apparatus for automated parts movement capable of reliably grasping and transporting an article, which can maintain the article in the proper orientation, and can accommodate articles of varying size without having to replace the gripper.

SUMMARY OF THE INVENTION

Accordingly, the present invention provides a transfer apparatus for automated parts movement which, in preferred form, comprises a cylinder with a pair of coaxial pistons operably attached to a transfer assembly which includes a gripper. The transfer apparatus can be actuated by any fluid commonly utilized in the art, but is preferably pneumatically actuated. One of the pistons is advanced to extend the transfer assembly and grip the article held thereby. The pistons are further advanced to move the transfer assembly, and the article held thereby, to a target destination. Further advancement of one piston causes the transfer assembly to release the article, and thereafter, both pistons are retracted. Consequently, the transfer apparatus of the present invention permits the grasping, transportation and deposition of an article to be accomplished using a pair of cooperating pistons, and thus eliminates the imprecision associated with transfer apparatus employing independent, separately actuated, piston assemblies to accomplish the grasping and transportation procedure.

According to one aspect of the invention, the transfer apparatus includes an enclosed cylinder sealed by a first and a second end. A first and a second fluid inlet port, in fluid communication with the interior of the enclosed cylinder, are located proximate to the first and second end, respectively. Slidably positioned within the cylinder is a first, or inner, piston which is slidably received by a second, or outer, piston. Attached to both the inner piston and outer piston is a transfer assembly equipped with a gripper extending through the second end of the cylinder. Introduction of fluid through the first inlet port moves the inner and outer piston axially within the cylinder, enabling the transfer assembly to grasp an article and subsequently move the article to a target destination. Continued introduction of fluid through the first inlet port results in the stripping or removal of the article from the transfer assembly. Once the article is removed from the transfer assembly, fluid is introduced through the second fluid inlet port, causing the retraction of the inner and outer pistons and thus, the transfer assembly to thereby complete the stroke. Employing a cooperating inner and outer piston, both of which are actuated by a single fluid source, maximizes the precision of the transfer apparatus.

According to another aspect of the invention, a transfer apparatus includes an enclosed cylinder having a first and a second end, and a pair of pistons slidably positioned within the cylinder. The pistons are operably connected to a transfer assembly. The transfer assembly includes a sheath attached to the piston assembly and extending through an opening in the second end of the cylinder, and an inner rod attached to the piston assembly and contained within the sheath. The rod is attached at its end to a gripper. Introduction of fluid through the first end of the cylinder effects movement of the piston assembly to sequentially extend the gripper beyond the end of the sheath, and move the inner rod, sheath, and gripper away from the second end of the cylinder. Introduction of fluid through the second end of the cylinder retracts the piston assembly, and moves the sheath, inner rod and gripper towards the first end of the cylinder. The transfer assembly of the present invention provides efficient and precise movement of articles to thereby increase the efficiency of the transfer process.

In a preferred embodiment, the gripper is a gripper assembly having a spring loaded jaw assembly threadably attached to the end of the inner rod. The use of a spring loaded jaw assembly enables the transfer apparatus of the present invention to be used to grasp articles of varying size without switching jaw assemblies. This in turn reduces the complexity and cost of the manufacturing operation. Additionally, threadably attaching the spring loaded jaw assembly to the inner rod prevents the spring loaded jaw assembly from rotating during transportation of the article. Hence, the article is maintained in the proper orientation to thereby enable its precise placement in the desired location. This feature permits the present invention to be used in applications wherein the orientation of the article must be maintained in order to fall within the clearances required by the particular manufacturing application.

These and other objects, advantages and features of this invention will become apparent upon review of the following specification in conjunction with the drawings.

BRIEF DESCRIPTION OF THE DRAWINGS

FIG. 4 is a detailed sectional view illustrating the second cushioning member positioned within the second end cap;

FIG. 5 is a sectional end view of the first end cap with the inlet ports and bleed port shown in phantom;

FIG. 6 is a sectional end view of the second end cap with the inlet ports and the bleed port shown in phantom.

DETAILED DESCRIPTION OF THE PREFERRED EMBODIMENTS

Figure 1:
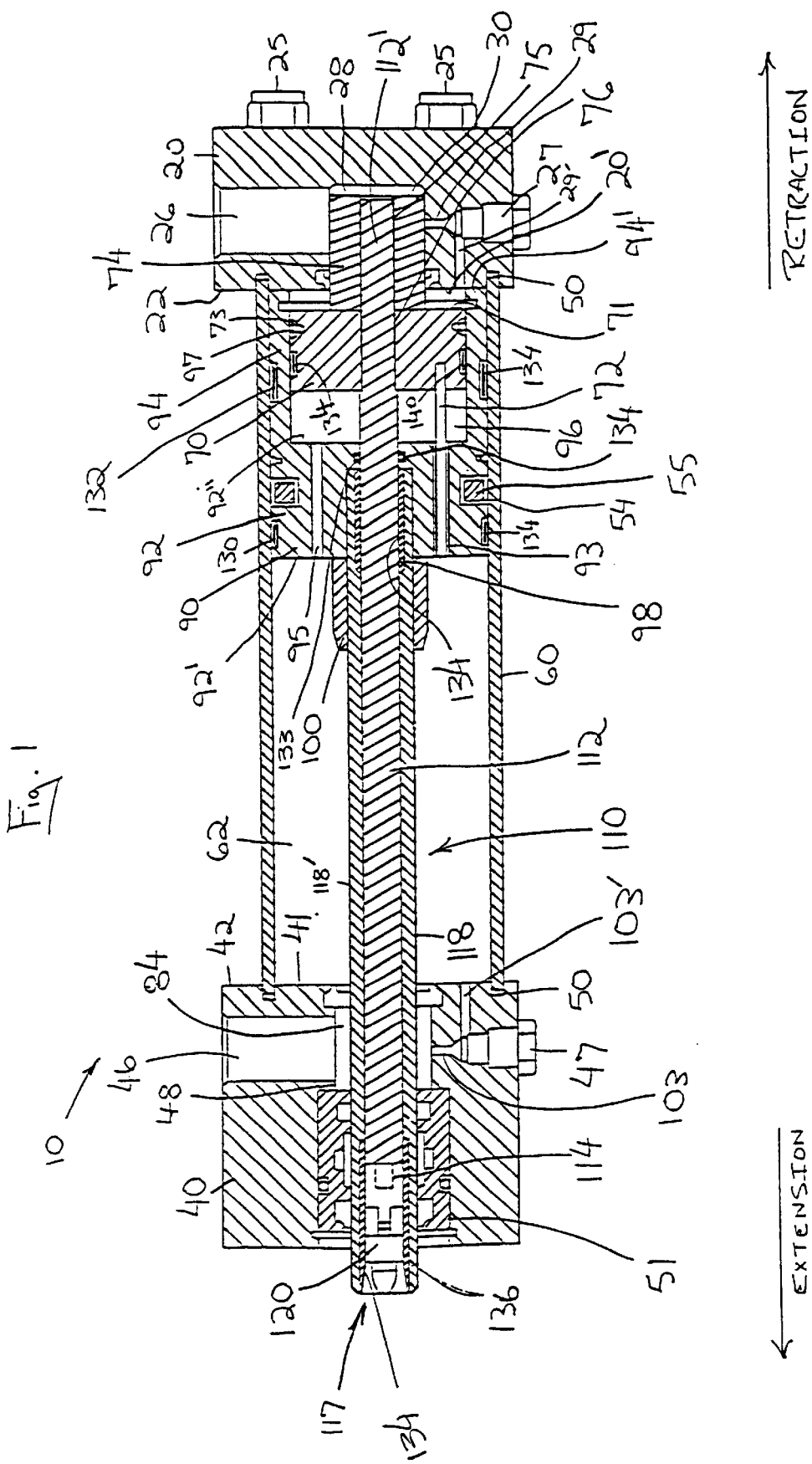
FIG. 1 is a sectional view of a transfer apparatus for automated parts movement according to the invention.

The present invention advances a transfer apparatus for the automated movement of parts which effectively grasps, transports and deposits a workpiece or article to a desired location. The apparatus can be used to transport a variety of articles normally encountered in an industrial setting. For example purposes only, such articles include, but are not limited to, nuts, bolts and weld studs. Furthermore, the apparatus of the present invention may be used to transport articles having varying sizes, without replacing the gripper assembly.

The transfer apparatus of the present invention utilizes a pair of cooperating pistons which are coupled to a transfer assembly equipped with a gripper. Introduction of fluid into the cylinder at one end advances the pistons, causing the transfer assembly to sequentially grasp and transport an article. Continued advancement of one of the pistons enables the transfer assembly to deposit the article in a desired location. Introduction of fluid at the opposing end of the cylinder retracts the pistons and the transfer assembly. The fluid employed to actuate the transfer apparatus may be any fluid normally employed in the art. Preferably, the transfer apparatus of the present invention is pneumatically controlled.

Referring now specifically to the drawings, and the illustrative embodiments depicted therein, a transfer apparatus for automated parts movement 10 includes a rearward or first end cap 20, and a forward or second end cap 40. Inner surfaces 22 and 42 of end caps 20 and 40, respectively, are each formed with an annular recess 50, allowing attachment to a cylinder 60. End caps 20 and 40 may be secured to cylinder 60 by any means common utilized in the industry, for example, by welding. Alternatively, end caps 20 and 40 may be fastened to cylinder 60 by tie rods (not shown) placed in apertures 43 of second end cap 40 (FIG. 6), and fastened by nut and bolt assemblies 25 positioned on first end cap 20 and received by threaded apertures 25'.

Slidably positioned within cylinder 60 is a first, or inner piston 70 and a second, or outer piston 90. As can be seen in FIG. 1, outer piston 90 includes a main body 92, integrally attached to an annular flange 94, extending towards first end cap 20. The inner diameter of annular flange 94 corresponds approximately to the outer diameter of inner piston 70 to thereby enable inner piston 70 to slidably move within the recess 96 defined by annular flange 94. A horizontal rod or stop pin 72 is attached to inner piston 70 and extends through an aperture 93 formed in outer piston 90. Outer piston 90 is further formed with a horizontally disposed through hole 95, extending from surface 92' through surface 92" of main body of outer piston to 92, to thereby enable fluid communication between interior 62 of cylinder 60 and recess 96 formed by annular flange 94.

Figure 2:
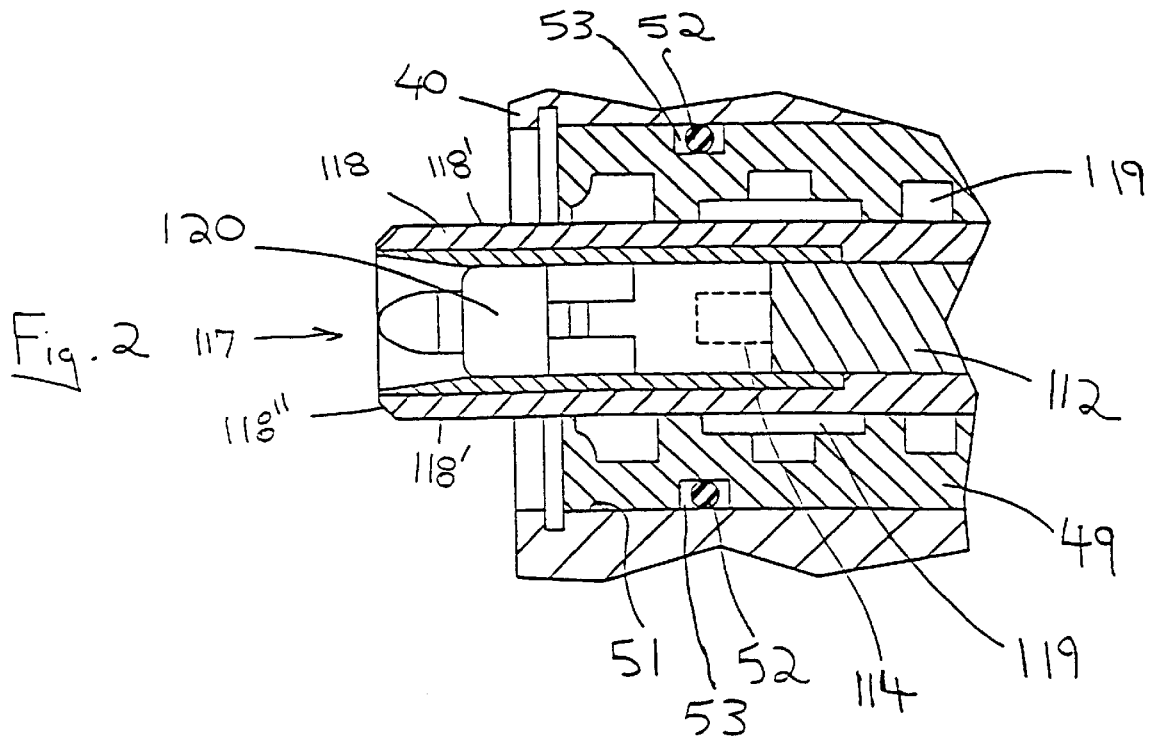
FIG. 2 is a detailed sectional plan view of the gripper in the retracted position according to a preferred embodiment of the invention.

Inner piston 70 and outer piston 90 are connected to a transfer assembly 110 which sequentially grasps, transports and releases an article (not shown) at a particular destination. Transfer assembly 110 includes an inner rod 112, an outer cylindrical rod or sheath 118 and a gripper 117. Inner rod 112 of transfer assembly 110 is rigidly connected to inner piston 70 and extends through an opening 98 in outer piston 90, and central opening 48 of second end cap 40. Sheath 118 is rigidly attached to outer piston 90 and extends through central opening 48 formed in second end cap 40. Sheath 118 surrounds inner rod 112. Inner rod 112 contains at its free end a threaded member 114 which is threadably attached to gripper 117. As shown in FIG. 2, in the fully retracted position, gripper assembly 117 is positioned within sheath 118.

Figure 3:
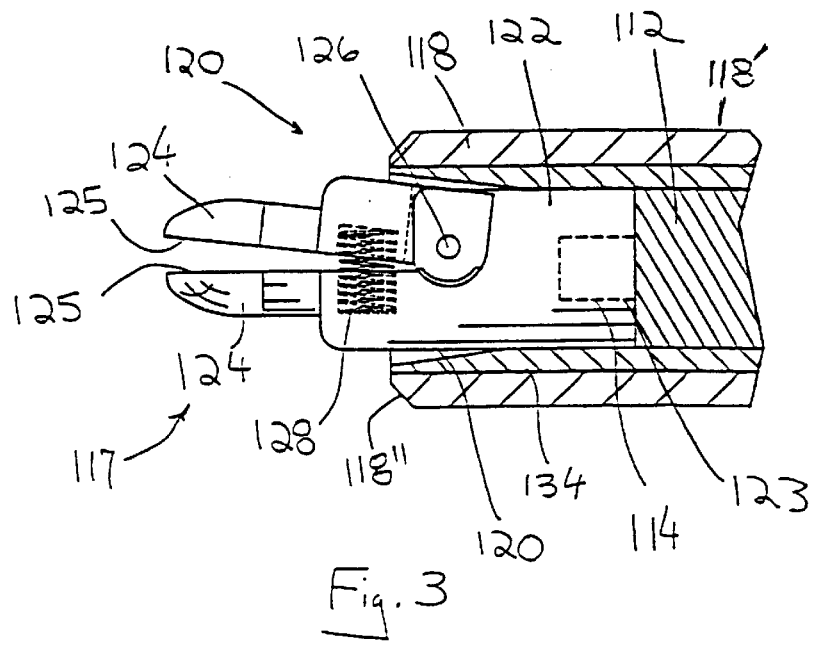
FIG. 3 is a detailed sectional side view of the gripper depicted in FIG. 2, shown in the extended position.

As shown in FIGS. 1 through 3, in a preferred embodiment, gripper 117 is a spring loaded jaw assembly 120 and includes a main body 122 having an internally threaded recess 123 dimensioned to engage threaded member 114 of inner rod 112. Spring loaded jaw assembly 120 further includes a pair of jaws 124, held in a preselected biased position by a tension pin 126 and a spring member 128. It will be recognized that jaws 124 permit articles of varying sizes to be effectively grasped since the inner surfaces 125 of jaws 124 define a wedge therebetween which allows an article to move lengthwise between jaws 124 until frictional contact is achieved between the article and inner surfaces 125.

Transfer assembly 110 is attached to second end cap 40 and extends therethrough. Attachment between transfer assembly 110 and second end cap 40 may be achieved by any mean normally utilized in the industry. For example purposes only, transfer assembly 110 is positioned in second end cap 40 by means of a cartridge 49 received by enlarged opening 51 formed in second end cap 40, and removably secured thereto by an O-ring 52 positioned within recess 53 of cartridge 49. Cartridge 49 is attached to the exterior surface 118' of sheath 118 by flanges 119, and is positioned a preselected distance from end 118" of sheath 118.

A first cushioning member 74 is attached to surface 71 of inner piston 70 and is dimensioned for receipt by opening 28 formed in first end cap 20. First cushioning member 74 is formed with an internally threaded through hole 75 dimensioned to receive externally threaded section 112' of inner rod 112 projecting from inner piston 70 and into first end cap 20. It will be recognized by those with ordinary skill in the art that other means of attaching first cushioning member 74 to inner rod 112 may be utilized without departing from the spirit and scope of the invention. A second cushioning member 100 extends from surface 92' of outer piston 90, and surrounds a portion of sheath 118. Second cushioning member 100 is received by an annulus 84 defined by exterior surface 118' of sheath 118 and central opening 48 of second end cap 40. First cushioning member 74 and second cushioning member 100 serve to reduce the impact stress incurred by transfer apparatus 10 during retraction and extension, as will be discussed in detail below.

A fluid inlet port 26, formed in first end cap 20, is in fluid communication with opening 28, and thus enables the introduction of fluid into interior 62 of cylinder 60 (FIG. 5). Inlet port 26 is attached to a source of pressurized air or other fluid (not shown). Similarly, inlet port 46, formed in second end cap 40, is in fluid communication with annulus 84 of second end cap 40 and is further in fluid communication with interior 62 of cylinder 60 (FIG. 6).

In operation, apparatus 10 begins a stroke in the retracted position, wherein first cushioning member 74 is positioned within opening 28 of first end cap 20. As can be seen in FIG. 1, when in the retracted position, there exists a gap 30 between first cushioning member 74 and first end cap 20, allowing fluid introduction within gap 30 to urge first cushioning member 74 towards interior 62 of cylinder 60. In the retracted position, inner piston 70 is positioned proximate to first end cap 20 and is held in position about annular flange 94 of outer piston 90 by a spring ball retainer 97 removably positioned within a recess 73 formed in inner piston 70. Also, lip 94' of annular flange 94 of outer piston 90 abuttingly contacts surface 20' of first end cap 20. In this position, spring loaded jaw assembly 120 is contained within sheath 118.

Introduction of fluid into inlet port 26 of first end cap 20 results in the movement of inner piston 70 within recess 96 and towards surface 92" of outer piston 90. As inner piston 70 moves towards outer piston 90, inner rod 112 moves in the direction indicated by the directional arrow labeled extension, and causes spring loaded jaw assembly 120 to extend beyond end 118" of sheath 118 (FIG. 3). When spring loaded jaw assembly 120 extends beyond sheath 118, jaws 124 move a preselected distance apart to thereby enable jaws 124 to grasp an article. Once inner piston 70 abuts surface 92" of outer piston 90, continued introduction of fluid into cylinder 60 through first end cap 20 causes the concurrent movement of inner piston 70 and outer piston 90 towards second end cap 40. The concurrent movement of inner piston 70 and outer piston 90 extends transfer assembly 110 in a direction away from second end cap 40 to thereby enable the article to be transported to its preselected destination. Movement of inner piston 70 and outer piston 90 towards second end cap 40 continues until stop pin 72, attached to inner piston 70, abuttingly contacts surface 41 of second end cap 40. Abutting contact between stop pin 72 and second end cap 40 halts the movement of inner piston 70, and thus also stops inner rod 112. Thereafter, outer piston 90 will continue to move toward second end cap 40. Continued movement of outer piston 90 moves sheath 118 over spring loaded jaw assembly 120 and thus strips or removes the article held between jaws 124. In the extended position, second cushioning member 100 is received by annulus 84. As can be seen in FIG. 4, a gap 104 exists between annulus 84 and second cushioning member 100 when apparatus 10 is in the extended position.

Retraction of the inner piston 70 and outer piston 90 within cylinder 60 is achieved by introducing fluid through inlet port 46 of second end cap 40. Fluid injected into second end cap 40 enters gap 104 and urges second cushioning member 100 in the direction indicated by directional arrow labeled retraction (FIG. 1) and effects simultaneous movement of inner piston 70 and outer piston 90 towards first end cap 20. Inner piston 70 and outer piston 90 continue movement towards first end cap 20 until lip 94' of annular flange 94 of outer piston 90 abuttingly contacts surface 20' of first end cap 20. Thereafter, continued introduction of fluid into cylinder 60 results in the movement of inner piston 70 towards first end cap 20. Continued movement of inner piston 70 after outer piston 90 contacts first end cap 20 is achieved by fluid traveling through through hole 95 formed in outer piston 90 and contacting inner piston 70. Movement of inner piston 70 towards first end cap 20 continues until recess 73, formed in the periphery of inner piston 70, contacts a spring loaded ball retainer 97 positioned in inner surface 97 of annular flange 94 to thereby complete retraction of the inner piston 70 and outer piston 90. As the pistons are retracted, transfer assembly 110, specifically the inner rod 112 and the sheath 118, move towards first end cap 20 to thereby enable apparatus 10 to repeat the transfer sequence.

First end cap 20 and second end cap 40 are each formed with a bleed valve 27 and 47, respectively. Bleed valves 27 and 47 enable fluid to be evacuated from cylinder 60 to thereby control the speed at which inner piston 70 and outer piston 90 move between the extended and retracted position. Bleed valve 27 is in fluid communication with opening 28 and interior 62 of cylinder 60 via channel 29 and 29', respectively. Similarly, bleed valve 47 is in fluid communication with both annulus 84 and interior 62 via channel 103 and 103', respectively.

Referring now to FIGS. 5 and 6, each end cap 20, 40 may be formed with a location port 29" and 45, respectively. Ports 29" and 45 are each dimensioned to accept a cylindricator switch (not shown) to enable the location of the pistons to be determined. Cylindricator switches are known by those with ordinary skill in the art as electrical devices which utilize a spring ball retainer to determine the absence or presence of an object. Here, the spring ball retainers of the cylindricator switches would come into removable contact with first cushioning member 74 and second cushioning member 100.

Alternatively, the position of inner piston 70 and outer piston 90 within cylinder 60 may be determined by the placement of a circular magnet 55 within an annular recess 54 formed in the periphery of outer piston 90. When magnet 55 is positioned within annular recess 54, an inductive proximity switch (not shown) is used to enable the location of the pistons to be monitored. The inductive proximity switch may be fastened to first end cap 20 or on a tie rod (not shown).

In order to provide frictionless travel between the moving components of transfer apparatus 10, such components include recesses dimensioned to accept annular bands of a material having a low coefficient of friction. The annular bands may be any material normally utilized in the industry to provide a frictionless interface between contacting surfaces. Specifically, outer piston 90 has a pair of annular recesses 130 and 132, each of which is dimensioned to accept an annular band 134. Also, the inner surface of outer piston 90 is formed with an annular recess 133 dimensioned to accept an annular band 134. Similarly, an annular recess 140, formed about the periphery of inner piston 70, is dimensioned to receive an annular band 134. Furthermore, an annular recess 136, positioned on the interior surface 118" of sheath 118 accepts an annular band 134, thereby reducing friction encountered by inner rod 112 as inner rod 112 moves within sheath 118 during extension and retraction.

Figure 7:
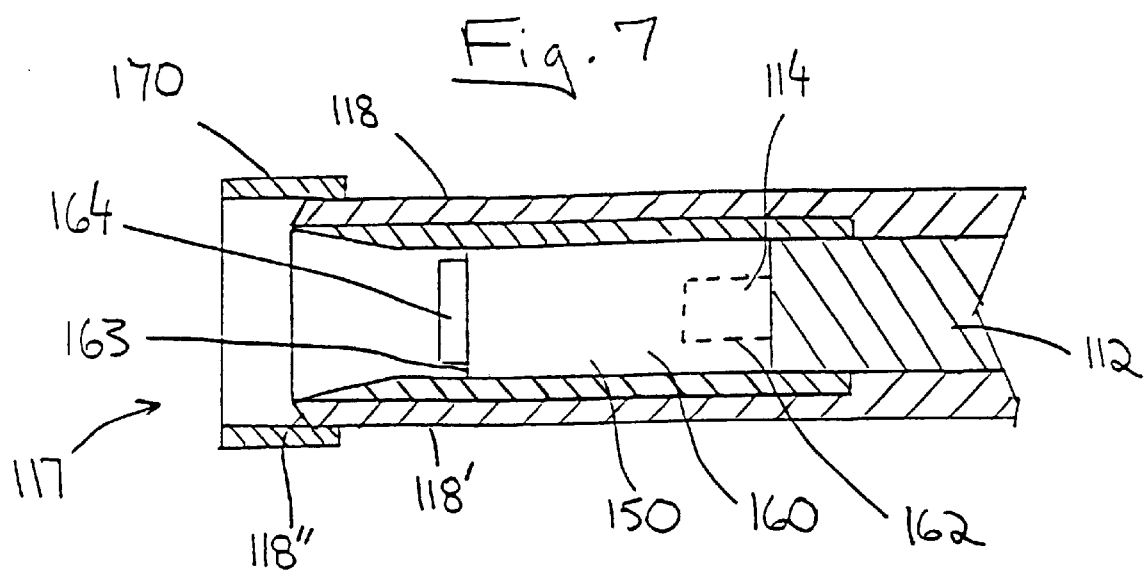
FIG. 7 is a detailed sectional view of a gripper assembly according to an alternative preferred embodiment of the present invention.

In an alternative preferred embodiment, as shown in FIG. 7, gripper 117 is a magnetic gripper. Preferably, the magnetic gripper is a magnetic gripper assembly 150, including a main body 160 and a non-magnetic ring 170. Main body 160 contains an internally threaded recess 162 attached to threaded member 114 of inner rod 112. A magnetic material 164 is attached to end 163 of main body 160. Magnetic material 164 may be any material commonly utilized in the art having the requisite magnetic properties needed to securely hold a particular article. Alternatively, main body 162 may be made of a magnetic material. Non-magnetic ring 170 is attached to end 118" of sheath 118. Non-magnetic ring 170 has at least approximately the same inner diameter as sheath 118, but may also be larger. Non-magnetic ring 170 serves to remove a particular article from main body 162 during the extension stroke. Non-magnetic ring 170 may be any non-magnetic material commonly used in the art, for example, stainless steel.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. An apparatus for automated parts movement comprising:

an enclosed cylinder having a first end and an opposing second end, and an interior, said enclosed cylinder including first and second fluid ports for selectively providing fluid pressure at opposite ends of said interior of said enclosed cylinder;

a piston assembly slidably positioned within said interior of said enclosed cylinder, said piston assembly comprising first and second pistons;

a transfer assembly coupled to said piston assembly and movable relative to said enclosed cylinder, said transfer assembly having a first portion coupled to said first piston and a second portion coupled to said second piston;

a gripper coupled to said transfer assembly, said gripper being adapted to grip a part; and wherein movement of said piston assembly within said enclosed cylinder in response to fluid pressure within said enclosed cylinder via introduction of fluid at at least one of said first and second fluid ports (i) moves said transfer assembly and said gripper relative to said enclosed cylinder in a first direction to an extended position relative to said enclosed cylinder, (ii) moves said first portion of said transfer assembly relative to said second portion of said transfer assembly to cause said gripper to release a gripped part, and (iii) moves said transfer assembly and said gripper in a second direction to a retracted position, said second direction being generally opposite said first direction.

2. The apparatus of claim 1, wherein said first and second pistons comprise a pair of coaxial pistons slidably positioned within said enclosed cylinder.

3. The apparatus of claim 2, wherein said first piston comprises an outer piston slidably positioned within said enclosed cylinder, said outer piston having a cylindrical surface extending toward said first end, said cylindrical surface defining a recess.

4. The apparatus of claim 2, wherein said second piston comprises an inner piston slidably positioned within said recess formed in said outer piston.

5. The apparatus of claim 3, wherein movement of said inner and outer pistons in said first direction moves said transfer assembly and said gripper to said extended position.

6. The apparatus of claim 5, wherein movement of said outer piston relative to said inner piston causes said gripper to release the gripped part.

7. The apparatus of claim 1, wherein said gripper comprises a jaw assembly having a pair of jaws and a biasing member.

* * * * *